United States Patent [19]

Irie

[11] Patent Number: 5,729,887
[45] Date of Patent: Mar. 24, 1998

[54] METHOD OF MANUFACTURING A THIN-FILM COIL

[75] Inventor: Kanji Irie, Tokai, Japan

[73] Assignee: Daidotokushuko Kabushikikaisha, Japan

[21] Appl. No.: 438,116

[22] Filed: May 8, 1995

[30] Foreign Application Priority Data

May 9, 1994 [JP] Japan ............... 6-120728
May 16, 1994 [JP] Japan ............... 6-126948

[51] Int. Cl.⁶ .............................. H01F 41/06
[52] U.S. Cl. .............. 29/602.1; 29/603.25; 336/200; 427/116
[58] Field of Search ............. 29/603.24, 603.25, 29/602.1; 336/200; 427/116, 131, 132

[56] References Cited

U.S. PATENT DOCUMENTS 4,677,036  6/1987  Nakamura et al. ........... 29/603.25 X
4,685,014  8/1987  Hanazono et al. ........... 29/603.25 X
5,448,822  9/1995  Wu et al. ..................... 29/603.24

FOREIGN PATENT DOCUMENTS 5242430  9/1993  Japan .
5250632  9/1993  Japan .

Primary Examiner—Carl E. Hall
Attorney, Agent, or Firm—William A. Drucker

[57] ABSTRACT

A resist is applied or an inorganic oxide is put from over the upper surface of a coil formed on an insulating layer and including wire members of a rectangular cross-section and channels between the wire members of the coil are filled halfway with the resist or the inorganic oxide. A space left in the channel is then coated with the inorganic oxide. The inorganic oxide, which is used in this manner for the purpose of preventing the deformation of the coil due to a secular change, can be filled without generating voids in the channel between the wire members, the physical strength of the most important upper location of the wire member becomes high and the electric characteristics of the coil are improved.

1 Claim, 4 Drawing Sheets

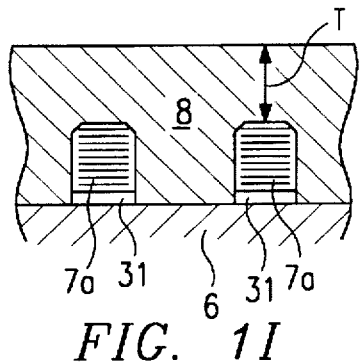
FIG. 1I
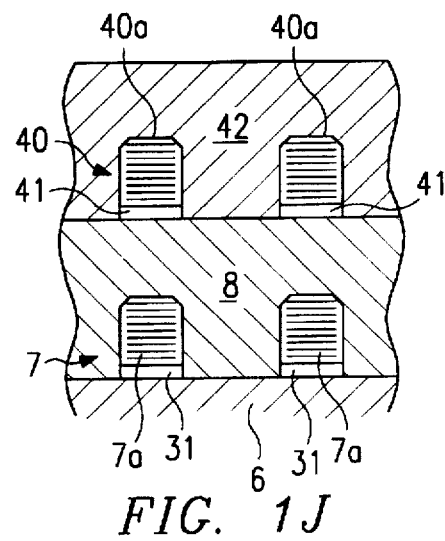
FIG. 1J
FIG. 2
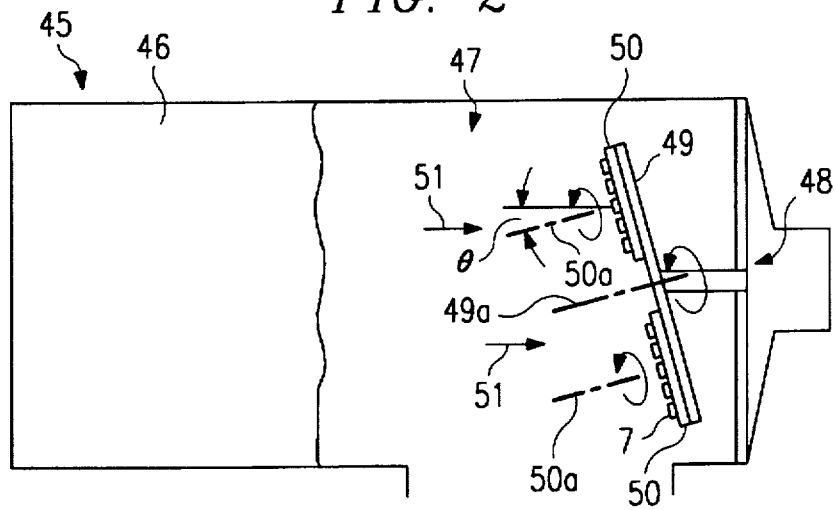
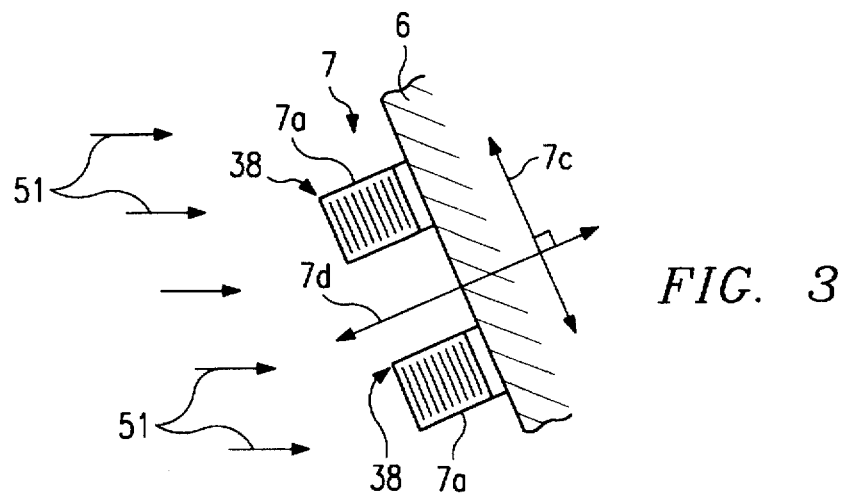
FIG. 3

FIG. 6A
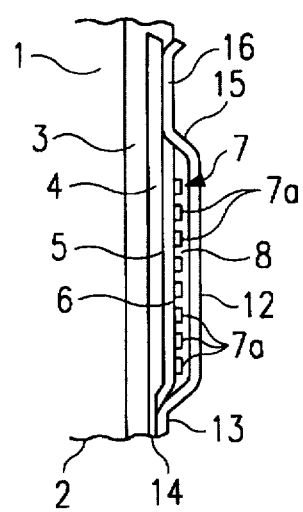
FIG. 6B
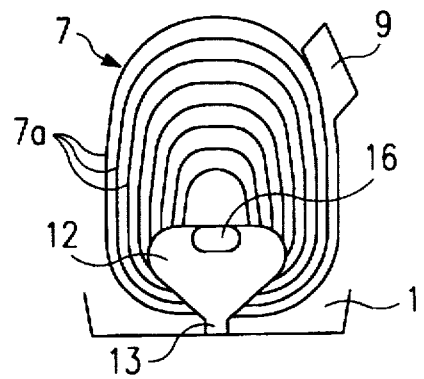
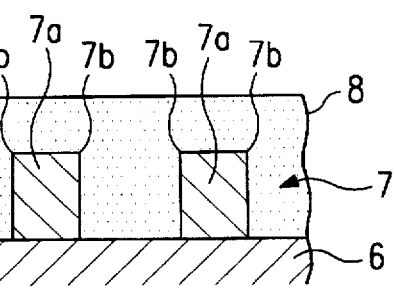
FIG. 7A
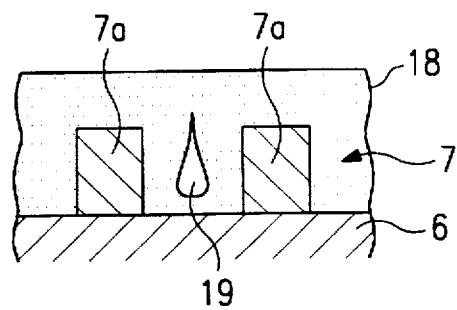
FIG. 7B
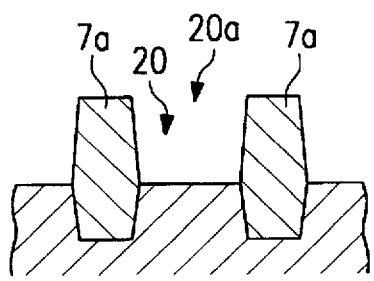
FIG. 8A
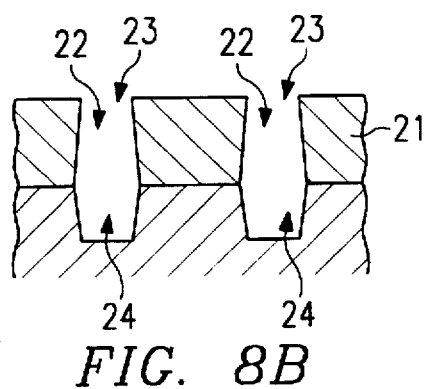
FIG. 8B

METHOD OF MANUFACTURING A THIN-FILM COIL

BACKGROUND OF THE INVENTION

1. Field of the Invention

This invention relates to a thin-film magnetic head and a thin-film motor, etc. used, for example, in a high density magnetic disc, and more particularly to a method of manufacturing a thin-film coil used in the head and the motor.

2. Description of the Prior Art

A known thin-film magnetic head is constructed, for example, as shown in FIGS. 6A and 6B. A reference numeral 1 in these figures shows a slider substrate, 2 a slider floating surface, 3 a lower protecting layer, 4 a lower magnetic layer, 5 a non-magnetic layer, 6 an insulating layer, 7 a spiral coil, 8 an insulating material to cover the coil 7 and maintain the electrical insulation between wire members 7a in the coil 7, 9 a terminal of the coil 7, and 12 an upper magnetic layer, respectively. A gap 14 is formed between a pole chip 13 in the upper magnetic layer 12 and the lower magnetic layer 4. A reference numeral 15 shows a yoke portion in the upper magnetic layer 12 and 16 a connection portion between the portion 15 and the lower magnetic layer 4. The lower magnetic layer 4, the upper magnetic layer 12 and the gap 14 existing therebetween form a closed magnetic circuit.

The spiral coil 7 is made in the form of a thin film, on the insulating layer 6 by the well known dry etching method or the electroplating method using well known resist patterns. The cross-section of the wire member 7a in the coil 7 is usually rectangular as shown in FIG. 7A. A photoresist is spin-coated as the insulating material 8, is filled in channels between the wire members 7a and covers the top side of them. (See, for example, Japanese published unexamined patent application No.5-250632.) A highly insulated thin film coil in which the surface of the wire member 7a is covered with the insulating material can be manufactured in this manner.

It is, however, a problem that the above mentioned coil 7 made in the form of a thin film is apt to be deformed by a secular change since the insulating material 8 is the photoresist. Moreover, ciliary projections are sometimes formed on the edge 7b of the top side of the wire member 7a when the coil 7 is made by the dry etching method. Such projections get near to those on adjacent wire members due to the external force generated in the process to fill the photoresist and the coil with these projections sometimes becomes a completed product. Then, there appears a problem that the projections deteriorate the electrical insulation between the wire members and causes a trouble in the coil.

If an inorganic oxide including alumina or silicon is used as the insulating material 8 for the settlement of the deformation problem due to the secular change, the deformation can be made difficult to occur. However, when the inorganic oxide is used, voids 19 are apt to be formed in the inorganic oxide 18 between the wire members 7a as shown in FIG. 7B. Such voids 19 bring about a problem that they may lower the physical strength of the thin film coil in the completed product and deteriorate electrical characteristics. It is, furthermore, a serious problem that void forming conditions such as a narrow and high space between wire members 7 are fulfilled since the number of turns of the latest coil 7 is increased for the purpose of improving reproducing sensitivity and the sectional area of the coil is increased for the purpose of reducing the electrical resistance of the coil.

In order that the above mentioned voids 19 may be prevented from being generated, a space 20 between adjacent wire members 7a is formed with a wider entrance 20a as shown in FIG. 8A. A resist pattern to form the wire member 7a is made, for the formation of the space, in a form as shown by a reference numeral 21 in FIG. 8B. (See, for example, Japanese published unexamined patent application No.5-242430.) However, when a lot of wire members 7a are made by electroplating, using the resist pattern of this sectional form, a hollow 22 for electroplating solution to penetrate into is formed with a narrow inlet 23 and it is difficult for stirring movement to reach interior parts 24 in some of the hollows 22. The ion concentration in such hollows 22 thus decreases and a problem consequently appears that the wire members 7a formed in respective hollows 22 vary in their thickness, such deterioration of the quality of thin films as low density is brought about and a completed coil is apt to become a substandard product.

SUMMARY OF THE INVENTION

The present invention has been done in order to solve the above mentioned problems of the prior art and a first object of the present invention is to provide that method of manufacturing a thin-film coil which can make the coil difficult to be deformed by secular change by using an inorganic oxide as an insulating material.

A second object of the invention is to provide that method of manufacturing a thin-film coil which can bury wire members without generating voids between them, make the most important upper location of the wire member physically strong and give satisfactory electrical characteristics even though an inorganic oxide is used, as an insulating material.

A third object of the invention is to provide that method of manufacturing a thin-film coil which can fill an insulating material between wire members without generating voids, make channels between the wire members physically strong and give satisfactory electrical characteristics even though an insulating material is an inorganic oxide.

According to the present invention, a small amount of an insulating material is first flown into the deep bottom portion of channels between wire members to make the channel shallow and then an inorganic oxide can be smoothly filled, without generating voids, into the important upper location of the channels between the wire members, even though the channels are narrow and relatively deep.

According to the present invention, furthermore, an inorganic oxide can be smoothly filled up into the whole space of the narrow and deep channels between the wire members and the generation of the voids can be effectively prevented. The present invention, therefor, has an advantage in increasing the height of the cross-section of the wire member and in making the channels between the wire members narrow.

Other objects and advantages of the invention will become clear from the following description taken in conjunction with the drawings.

BRIEF DESCRIPTION OF THE DRAWINGS

FIGS. 1A through 1J are sectional views showing a process to form a thin-film coil;

FIG. 2 is a view partially in section showing an ion beam processing apparatus;

FIG. 3 is an enlarged view showing the situation of ion beam etching;

FIG. 6A is a longitudinal sectional view of a thin-film magnetic head;

FIG. 6B is a plane view of FIG. 5A;

FIG. 7A is an enlarged longitudinal sectional view of a conventional thin-film coil;

FIG. 7B is an enlarged longitudinal sectional view of a thin-film coil showing generated voids;

FIG. 8A is a view showing the sectional form of wire members in another conventional coil and FIG. 8B is a view showing a sectional form of a resist pattern to form the wire members in FIG. 8A.

DESCRIPTION OF THE PREFERRED EMBODIMENTS

Figure 1A:
Figure 1B:
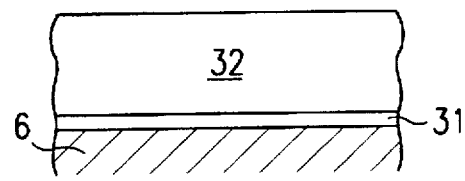
Figure 1C:
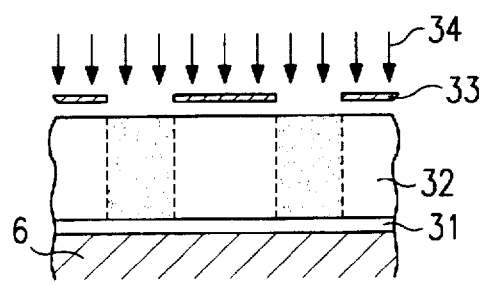
Figure 1D:
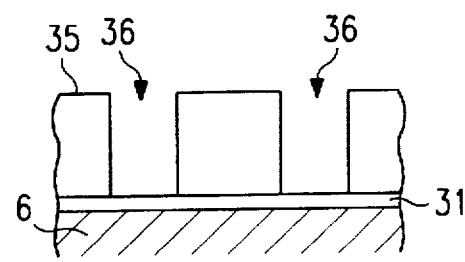
Figure 1E:
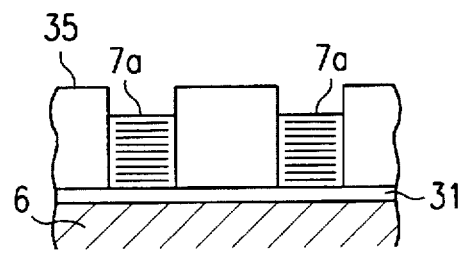
Figure 1F:
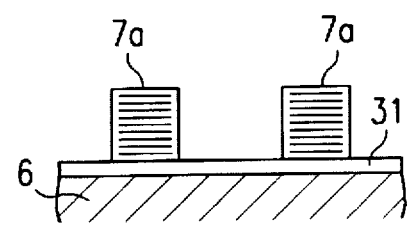
Figure 1G:
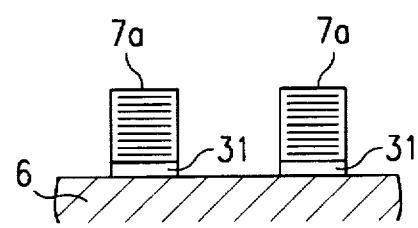

Embodiments of the present invention are explained in reference with drawings. An example of a general method of forming a thin-film coil is explained in reference with FIGS. 1A and 1G before detailed description of the embodiments. A seed layer 31 to plate a coil thereon is first formed on an insulating layer 6 by sputtering as shown in FIG. 1A. A titanium or chromium layer is used as the seed layer 31 from the point of view of good close adhesion to the insulating layer 6. A photoresist 32 is then coated on the seed layer 31 as shown in FIG. 1B. The photoresist 32 is covered with a photomask 33 and is exposed to ultraviolet rays 34 as shown in FIG. 1C. The photoresist 32 is developed and is further post-baked, and a photoresist pattern 35 provided with depressions 36 for plating is formed as shown in FIG. 1D. The depressions 36 are electroplated with copper and wire members 7a of a coil 7 with a basic rectangular section are formed as shown in FIG. 1E. The photoresist pattern 35 is exfoliated and removed as shown in FIG. 1F and the seed layer 31 between the wire members 7a of the coil is further removed, for example, by ion beam etching as shown in FIG. 1G. The thin-film coil is formed in this manner.

The thin-film coil shown in FIG. 1G can be formed as well by the known dry etching different from the above mentioned electroplating.

Figure 1H:
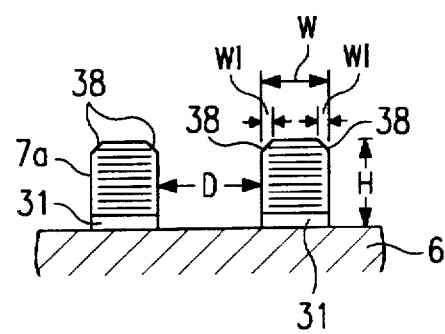

Corners 38 of the wire member 7a in the coil 7 may be cut off obliquely as shown in FIG. 1H as occasion demands and the sectional form of the wire member 7a may be a substantial rectangular. The corners 38 can be cut by an ion beam processing apparatus 45 to be described later but they may be cut by a processing apparatus making use of plasma arc discharge. A height H of the wire member 7a is, for example, 3 μm, a width W, for example, 3 μm, and a separation D, for example, 3~4 μm. A width W1 of the obliquely cut corner 38 is 3~10%, for example, about 5% of the width W and the angle of the oblique surface about 45°. An insulating material 8, for example, an inorganic oxide including alumina or silicon is filled in the channels between wire members 7a and put on the upper side of the wire member by sputtering. A thickness of coating T is, for example, 3μm.

In order to make the coil in the form of two layers the above mentioned process in FIGS. 1A through 1I is repeated once more in an embodiment of the present invention and another coil 40 is formed on the coil 7 as shown in FIG. 1J. A reference numeral 41 shows a seed layer, 40a wire members of the coil 40, and 42 an insulating material (aforementioned inorganic oxide). When the process in FIGS. 1A through 1J is finished, a thin-film coil including two layers of coils 7 and 40 buried in the insulating material is completed. When a magnetic head has the structure including these double layer coils 7 and 40, the electrical characteristics of the head can be improved. The coil may consist of a single layer or layers more than 2.

In the next place, a process to cut corners of the wire member 7a by a ion beam processing apparatus 45 is explained in reference with FIG. 2. A reference numeral 46 shows an ion beam generating means and 47 a processing chamber adapted to be evacuated. A substrate holder 48 is provided with a first rotating panel 49 adapted to rotate about a rotation axis 49a and second rotating panels 50 mounted on the first rotating panel 49 and adapted to rotate about a rotation axis 50a parallel with the rotation axis 49a. An angle θ between the rotation axis 50a in the substrate holder 48 and an incident direction 51 of the ion beams is adapted to be freely adjusted in order that the irradiating direction of the ion beams relative to a workpiece may be arbitrary adjusted. When the corner of the wire member 7a made of copper is processed to be cut off, the angle θ is set, for example, equal to about 45°.

The coil 7 is mounted on the second rotating panel 50 in such a manner that the coil 7 is irradiated by ion beams as shown by arrows 51 in FIG. 3 in a direction inclined from a direction 7d perpendicular to a direction 7c along a surface of the coil 7. This mounting can be done in the following way. A lot of coils 7 are formed on one side of a substrate called a wafer with the directions 7c of respective coils 7 in parallel with one side of the substrate as is well known in the prior art to form a thin-film coil. Accordingly, if the substrate is mounted with one side thereof overlapping on the second rotating panel 50, the direction 7d is almost parallel with the rotation axis 50a and the direction 7d can be inclined from the direction 51 by the angle θ.

When ion beams irradiate the coil thus mounted, they are incident almost right on the corner 38 of the wire member but obliquely on the other part of the coil as is clear in FIG. 3. The etching by ion beams, therefor, progresses most at the corner 38 which is cut off by and by to become an inclined surface. The ion beams irradiate the coil while the first and second rotating panels 49 and 51) are rotated. All the surface of the coil 7 is irradiated by ion beams incident in the directions inclined from the direction 7d by the angle θ. Consequently, the corners of the wire member 7a of the spiral coil 7 become inclined surfaces along the whole spiral path of the coil, the inorganic oxide 8 is easily filled and voids are difficult to be generated.

Figure 4A:
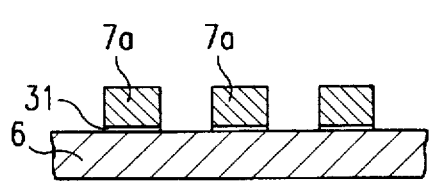
FIGS. 4A through 4E are sectional views of a thin-film coil showing a process to apply an inorganic oxide on the coil.
Figure 4B:
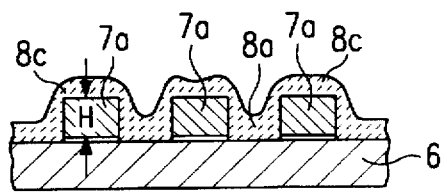
Figure 4C:
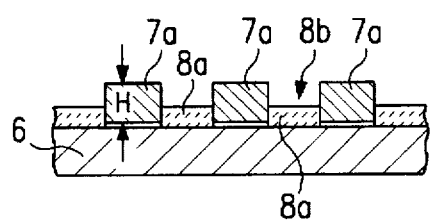
Figure 4D:
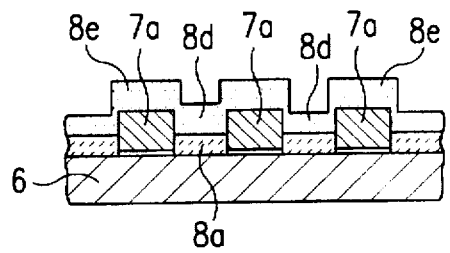

Now a means to fill the inorganic oxide between and on a lot of wire members 7a in the thin-film coil as shown in FIG. 1G is explained in reference with FIGS. 4A through 4E. A coil consisting of a lot of wire members 7a similar to those in FIG. 1G is first formed on an insulating material 6 (see FIG. 4A). The method to form this coil is the same as that explained in reference with FIGS. 1A through 1J, and may be the dry etching method or the electroplating method. A resist which can become fluid at a high temperature in a short time is then applied on the wire members 7a as shown in FIG. 4B. A spinner is preferable as a means to apply the inorganic oxide. The amount of the resist is limited to an extent that a resist 8a fills about half of a depth H of channels between the wire members 7a and an upper space 8b is left as shown in FIG. 4C. A resist 8c accumulates as well on the wire members 7a and 7a, in this case, as shown in FIG. 4B. Accordingly, it is preferable to include the amount of this accumulating resist 8c into the amount of the above mentioned resist filling the channels since the accumulation resist will become fluid in an atmosphere at a high temperature (200° C. for example) as is well known and flow into the channels between the wire members 7a. When the resist 8c is too much, an excessive amount is removed in advance. The resist shown in the FIG. 4B becomes fluid and chances into a form shown in FIG. 4C. When the cross-section as shown in FIG. 4C is present, that is, when the channel between wire members 7a is already filled up halfway with the resist 8a and is shallow, the inorganic oxide applied on this coil by sputtering can easily enter the channels between the wire members 7a and the voids 19 as shown in FIG. 7B can not be generated. Consequently, when the inorganic oxide is sputtered on the coil, the relatively shallow space 8b can be completely filled up with an inorganic oxide 8d as shown in FIG. 4D and the whole coil is covered with the inorganic oxide 8 similarly as shown in FIG. 1I.

Figure 4E:
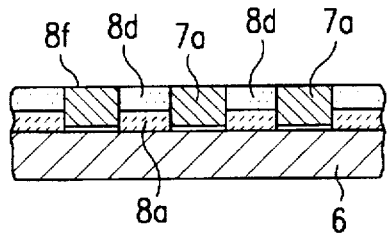

Another inorganic oxide may be piled up, as shown in FIG. 1I, on the inorganic oxide completely filling the upper part of the channels between the wire members 7a and several of the units shown in FIG. 1I may be poled one upon another as shown in FIG. 1J. However, when a certain use demands, an inorganic oxide 8e over the wire members 7a in FIG. 4D may be removed by a known grinding means as shown in FIG. 4E and a top surface 8f of the wire member 7a may be at the same height as a top surface of the inorganic oxide 8d.

When the channels between the wire members are filled with the inorganic oxide, the deep part of the channel, where physical strength is not required, is filled with a highly fluid resist and the channels between the wire members are made shallow. The inorganic oxide thereby can smoothly penetrate into the channels and be filled in the upper part of the channels between the wire members without generating voids. The inorganic oxide which is filled, without voids, in the upper part of the channels between the wire members effectively shows high physical strength and high dielectric strength.

Figure 5A:
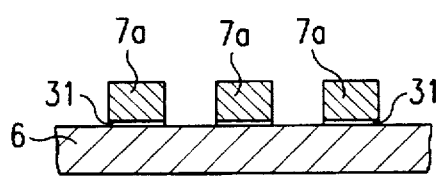
FIGS. 5A through 5F are sectional views showing a process to apply an inorganic oxide on a thin-film coil.
Figure 5B:
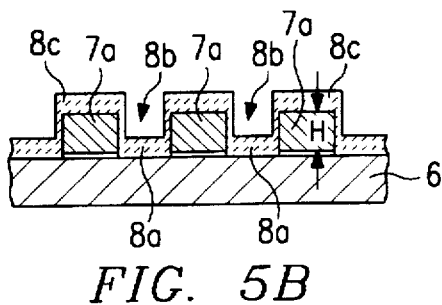
Figure 5C:
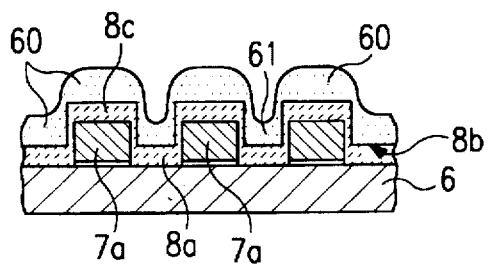
Figure 5D:
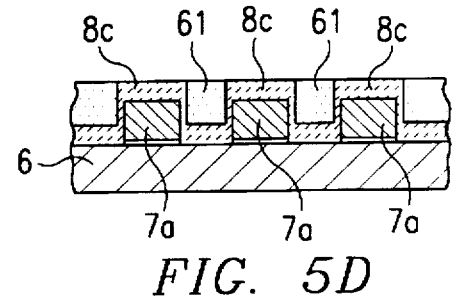

In the next place, another means to fill the inorganic oxide 8 between and on a lot of wire members in the thin-film coil as shown in FIG. 1G is explained in reference with FIGS. 5A through 5F. A coil consisting of a lot of wire members 7a similar to those in FIG. 1G is first formed on an insulating material 6. (See FIG. 5A.) The method to form this coil is the same as explained in reference with FIGS. 1A through 1J and may be the dry etching method or the electroplating method. An inorganic oxide is applied, in the next process, to fill the channels between the wire members of the coil halfway. The inorganic oxide (alumina) is sputtered on the wire members 7 and coats them. The amount of the inorganic oxide is limited to an extent that about half of a depth H of the channel is filled with an inorganic oxide 8a and a space 8b is left. An inorganic oxide 8c accumulates also over the wire members 7a in this case. A resist is applied, in the next process, on the upper surface of the coil to fill completely the space left in the channel between the wire members. A resist 60 is applied on the inorganic oxides 8a and 8c, for example, as shown in FIG. 5C. A part of resist 61 penetrates into the space 8b in this case.

Figure 5E:
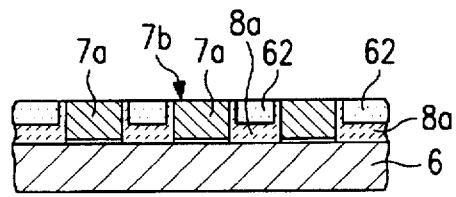
Figure 5F:
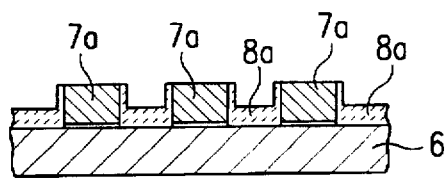

Furthermore, when the resists 60 and 61 come in contact with an atmosphere at a high temperature (200° C. for example), they become fluid. The resist 61 penetrates into between the inorganic oxides 8c and is at the same height as the inorganic oxide 8c. The inorganic oxide over the top surface of the coil is removed in the next process. The inorganic oxide 8c over the wire members 7a, for example, in FIG. 5D and the upper half of the resist 61 contiguous to the inorganic oxide 8c are removed. The known etchback method is preferably used as the means to remove them. This method effectively removes the inorganic oxide in FIG. 5D together with the resist and forms the unit shown in FIG. 5E as is clear from the aforementioned explanation taken in reference with FIGS. 2 and 3. When an insulating layer 6 in FIG. 5E is mounted on the surface of the second rotating panel 50, the positional relationship between the second rotating panel 50 in FIG. 2 and the coil 7 mounted on it is preferably referred to. The part over the wire members 7a is removed as shown in FIG. 5E similarly as in the aforementioned case. When the inorganic oxide 8c is removed by the ion etching method of FIGS. 2 and 3, the angle θ of the rotation axis 50a relative to the incident direction 51 of the ion beams is preferably selected so that the inorganic oxide 8c and the resist 61 are removed to a nearly equal height. A resist 62 left in the channel protects the inorganic oxide 8a present in the channel in this etching. When the resists 62 left on the inorganic oxides 8a in FIG. 5E are removed by a known solvent, a unit having a cross-section as shown in FIG. 5F is formed. When the cross-section of this FIG. 5E is formed, that is, when the channel between the wire members 7a is already filled up halfway with the inorganic oxide 8a and is shallow, the inorganic oxide applied, in succession, on the wire members by sputtering can penetrate into the channel between the wire members 7a and the voids 19 as shown in FIG. 7B can not be generated. The relatively shallow channels between the wire members 7a, 7a are completely filled up with the inorganic oxide and the whole coil is covered completely or nearly completely with the inorganic oxide 8 as shown in FIG. 1I. When the full depth of the channels between the wire members is filled with the inorganic oxide by 2 or 3 stages, the inorganic oxide can penetrate into the channels between the wire members and be filled in the channels between the wire members without generating the voids. The inorganic oxide filled in the channels between the wire members without the voids shows high physical strength and high dielectric strength.

What is claimed is:

1. A method of manufacturing a thin-film coil comprising the steps of:

(a) providing a coil having an upper surface, disposed on an insulting layer and having wire members having a rectangular cross-section;

(b) sputtering an inorganic oxide over said upper surface of said coil whereby channels between said wire members of said coil are filled halfway with said inorganic oxide;

(c) placing a resist over said upper surface of said coil while providing a space in said channel which is completely filled with said resist;

(d) removing said inorganic oxide from said upper surface of said coil;

(e) removing said resist from said channel between said wire members; and (f) sputtering said inorganic oxide in said space left in said channel and over said wire members to coat said members and said space with said inorganic oxide.

* * * * *